Figure 1:
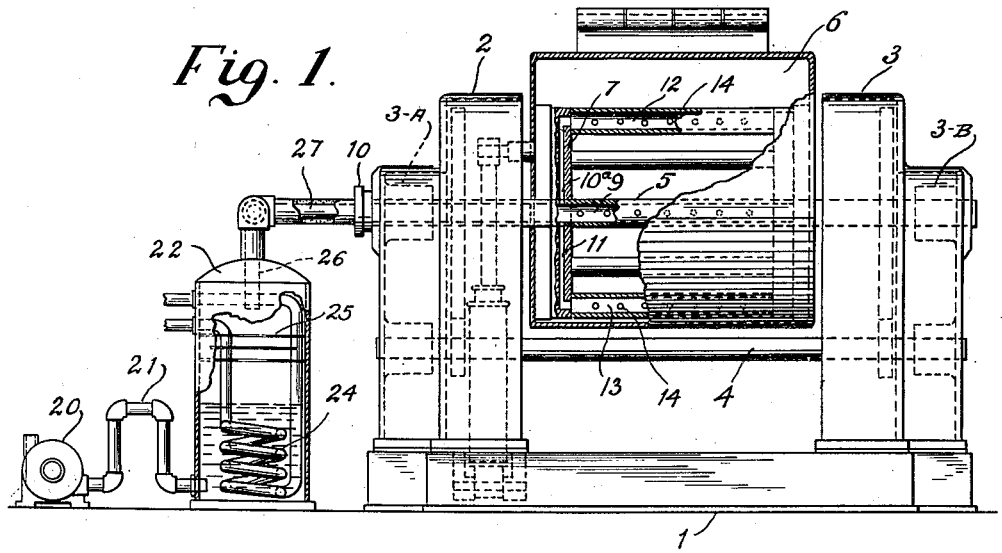
Figure 2:
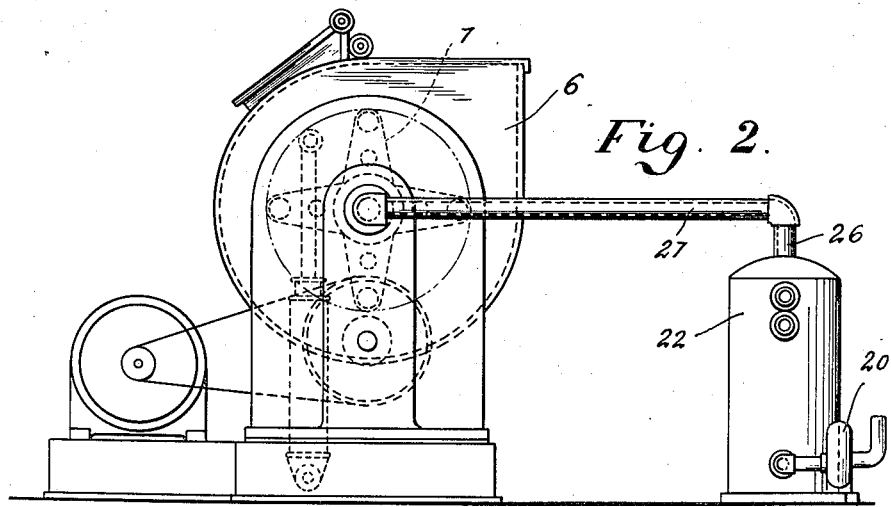

July 15, 1924.

W. A. DARRAH

PROCESS OF MAKING BREAD

Filed Jan. 26, 1922

1,501,527

INVENTOR
William A. Darrah

Patented July 15, 1924.

1,501,527

UNITED STATES PATENT OFFICE.

WILLIAM A. DARRAH, OF CHICAGO, ILLINOIS.

PROCESS OF MAKING BREAD.

Application filed January 26, 1922. Serial No. 531,977.

*To all whom it may concern:*

Be it known that I, WILLIAM A. DARRAH, a citizen of the United States, residing at Chicago, in the county of Cook and State of Illinois, have invented a new and useful Improvement in Processes of Making Bread, of which the following is the specification.

This invention relates to methods and apparatus for making dough, particularly bread and related products in which yeast and related organisms play a part.

Bread prepared in the method which forms the basis of this application requires less yeast, develops more quickly, produces a whiter loaf with excellent flavor and good texture. This invention has for its object the securing of the advantages outlined above, and others which will be set forth and evident in the description which follows. In order to make clear this invention I will first describe in detail the fundamental equipment which may be employed to assist in securing these results, and then point out the process more specifically. It should be understood, however, that many different means of accomplishing the result here described may be employed without departing from the spirit of this invention.

Referring to the drawing, Figure I is a side elevation, partly in section, showing one form of mixer adapted for use with this invention, while Figure II is a diagrammatic layout showing one arrangement of equipment which I have found satisfactory.

Referring to the drawings (1) indicates a dough mixer base upon which are mounted pedestals 2—3 supporting bearings 3ᴬ 3ᴮ. A countershaft 4, carried by pedestal 2—3, is driven by means of a motor and other suitable sources of power not shown.

Countershaft (4) drives main shaft (5) through some form of suitable speed reduction. A mixer bowl (6), in which the dough is placed, contains beater mechanism (7) carried on shaft (5). During the operation of the mixer the beater mechanism (7) is rotated at any desirable speed, such as 70 revolutions per minute thoroughly mixing and commingling the ingredients.

Main shaft (5) is bored with a channel (9) through which air is forced. Air is led into channel (9) and out, entering channels (10) and (11) in the beater mechanism (7), finally reaching the beater arms (12) and (13). Beater arms (12) and (13) are perforated as indicated at (14), allowing the air to escape and mingle with the dough.

Referring to Figure II, reference number (20) indicates a blower from which air under pressure of about seven pounds travels through pipe (21) to tank (22). Tank (22) is filled about two-thirds with a solution of calcium chloride brine containing such other ingredients as may be desired. A series of cooling coils (24) are immersed in said brine and serve to keep it at any desired temperature, as, for example, 15 degrees F. The air which enters tank (20) will therefore bubble through the brine solution and become cooled to a low temperature. Baffles (25) serve to remove the excess of brine and liquids from the air, which then passes through outlet (26) along pipe (27) and enters the stuffing box 10ᴬ of the dough mixer.

It will be evident from a consideration of the disclosure in this invention, and the claims attached thereto, that the air may be introduced into the mixer in many ways, as, for example, it may be blown into the mixing bowl from the side or the top without entering the beater bars at all. I have, however, found it of advantage to introduce it through the beater arms.

It will also be evident that many other methods may be resorted to for cooling the air and saturating it with traces of brine solution. For example, the air may be passed through a spray or shower of brine, after the manner of certain air washers now on the market.

The object of passing the air through the brine is partly to reduce its temperature and partly to saturate it with the solid ingredients of the brine. For example, if the brine is calcium chloride mixed with traces of ammonium chloride, it is noticeable on careful examination, that minute traces of these materials are carried by the air into the dough and being distributed uniformly throughout the entire content of the dough. These ingredients have a remarkable action in accelerating the growth and development of the yeast. It will be evident that by this method the yeast is supplied with air simultaneously with the supply of calcium chloride, ammonium chloride, or other chemicals. It is obviously possible to supply phosphates or volatile compounds, such as gaseous ammonia, by this same method. It is a theory that the slight acid re-action of the calcium chloride tends to cause a flocculation of some of the colloids in the bread, noticeably the gluten, thus increasing its resilience and tenacity. I wish it to be understood that the above method is only a theory by which this result is accomplished. My invention deals with the result, and I am mentioning the above theory mainly as being helpful in understanding the manner of accomplishing the result. It is of course a well known fact that calcium chloride in small quantities, particularly in connection with other ingredients, has an accelerating action upon the yeast. My invention differs, however, from known methods of applying calcium chloride, in that by introducing it in the air stream simultaneously with supplies of oxygen, it is much more uniformly distributed through the dough and a much smaller amount of calcium chloride will produce marked results. Some tests that I have made indicate that an amount of calcium chloride introduced by my method will be nearly ten times as effective as the same amount of calcium chloride introduced by adding it directly to the dough in the form of a solution or suspension.

It will be also understood, that in place of the brine solution herein referred to, any solution which it is desired to introduce into the dough may be substituted. Thus a solution of ammonium chloride in water may be used to advantage in certain cases, or the solution may contain water, phosphates, potassium chloride, or other desirable compounds.

It would appear that one of the reasons why the process here described is so effective, results from the stimulation of the yeast organism by supplying a continual source of fresh oxygen, by removing the carbon dioxide and other products of life re-action (by the rapid motion of the stream of air) and at the same time supplying a yeast food. It will be understood that under the conditions here described, the yeast organism will be placed under the most favorable conditions for rapid development, thus causing it to be affected most favorably with a minimum amount of calcium chloride or other stimulant.

One of the particular features of my invention depends upon securing the results here outlined more effectively than can now be secured by so-called commercial yeast foods and by using only a fraction of the materials now employed in commercial yeast foods. It will also be evident that the small amount of the materials which I employ are very uniformally distributed through the dough. This is probably one reason why a small amount of the yeast food is so highly effective in the case under discussion.

Having now fully described my invention, what I claim as new and wish to cover by Letters Patent in the United States is as follows:

1. The process of mixing dough which consists in agitating the ingredients in the mixer, and while being so agitated subjecting said ingredients to the action of a stream of air which has been passed through a brine solution.

2. The process of making dough which consists in introducing within the dough while being mixed, a stream of gases which have previously been passed through a solution of calcium chloride.

3. The process of mixing dough which consists in subjecting the dough while being agitated, to the internal action of a stream of gases carrying a minute amount of yeast foods in suspension.

4. The process of treating dough which consists in simultaneously removing a portion of the carbon dioxide produced by the yeast re-action, adding additional fresh air and supplying a yeast food diffused in minute quantities through the fresh air which is added.

5. In the process of making dough the step which consists in forcing air rapidly through a solution containing yeast foods, removing the larger drops of said solution from said air, and passing the air containing traces of said yeast food solution into the dough.

6. In the process of making dough the step of simultaneously introducing fresh oxygen and yeast food, and simultaneously removing a part of the products of the life process of said yeast.

7. In the process of making bread, the step which consists in passing air first through cold calcium chloride in solution, and second, into the dough.

WILLIAM A. DARRAH.